Feb. 14, 1961 G. A. SPENCER 2,971,319
SPLICING PLASTIC FILAMENTS
Filed July 22, 1955 2 Sheets-Sheet 1

INVENTOR.
GEORGE A. SPENCER
BY
W. A. Fraser
ATTY.

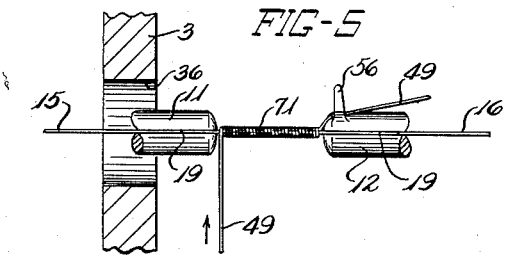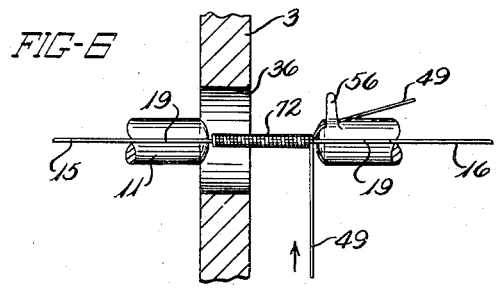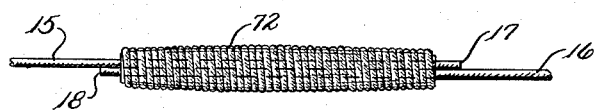

United States Patent Office 2,971,319
Patented Feb. 14, 1961

2,971,319

SPLICING PLASTIC FILAMENTS

George A. Spencer, Akron, Ohio, assignor to The Firestone Tire & Rubber Company, Akron, Ohio, a corporation of Ohio Filed July 22, 1955, Ser. No. 523,896

3 Claims. (Cl. 57—22)

The invention relates to an improved method and apparatus for splicing cords and more particularly to new and novel means for wrapping two cord ends with a third cord.

In the heat treatment of nylon tire cords it is customary to subject the cords to high cord tensions and to temperatures in the range of 212° F. to 450° F. Where two ends of cords must be joined, the usual types of textile knots have been found not to hold, the most satisfactory being a special knot known as a barrel knot. This knot, however, is very bulky and, when passed through the calendar, crushes and is broken, leaving a weak place in the fabric; furthermore, this special knot will often slip or break at tensions above seven pounds in the heat treatment zone.

The present invention solves the problems by providing a machine for and a method of joining together two lapped cord ends by wrapping them with a third cord.

It is an object of the present invention to provide novel means for joining two ends of cords in a non-slipping, high-strength manner.

It is a further object of the invention to provide a method of joining two ends of cords in such a flexible manner that a small diameter splice results.

Still another object of the invention is to provide apparatus for securely splicing two ends of cords.

These and other objects and advantages of the invention will become apparent from the following description of a preferred form of the invention, reference being had to the accompanying drawings in which:

Figures 4, 5 and 6 are enlarged fragmentary, somewhat diagrammatic, views of the beginning, midpoint and end, respectively, of the splice-winding cycle; and Figure 7 is an enlarged view of the finished splice.

Figure 1:
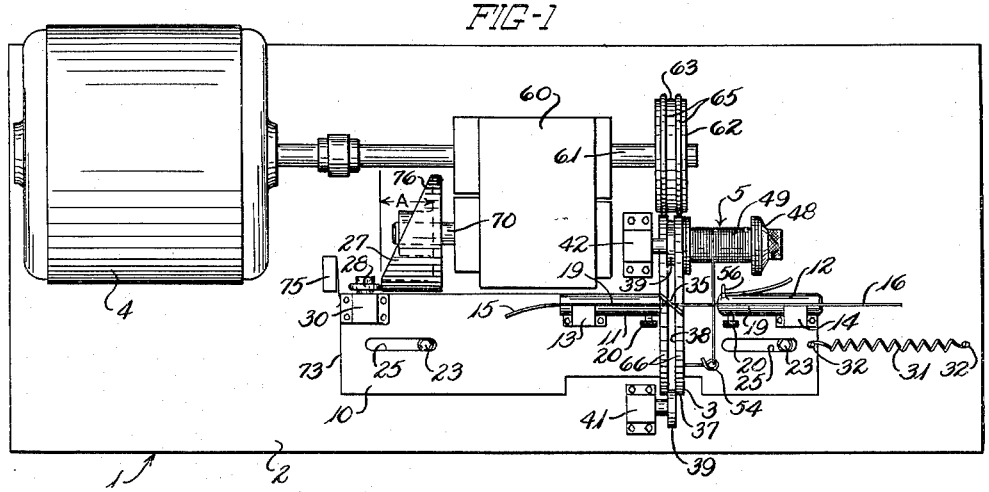
Figure 1 is a top plan view of apparatus embodying the invention.
Figure 2:
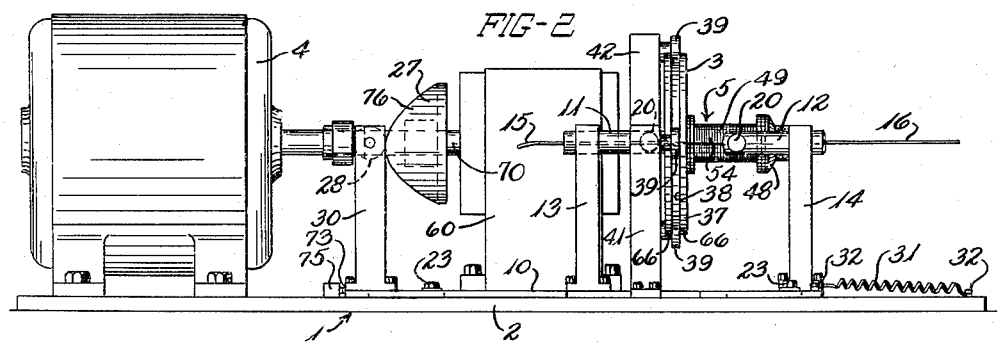
Figure 2 is a side elevation of the apparatus of Figure 1.
Figure 3:
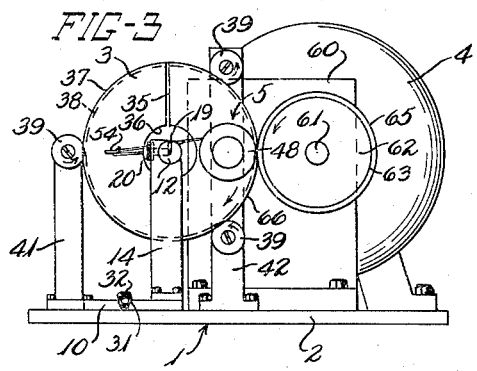
Figure 3 is a right end elevation of the apparatus of Figure 1.

The apparatus embodying the invention comprises essentially a carriage holding two cords to be spliced tautly aligned with their ends overlapped and parallel for an appreciable distance, and a bobbin carrying splicing cord rotatable about the overlapped cords as the carriage moves axially, whereby a close helical wind of splicing cord is laid about the overlapped cords.

Referring now particularly to the drawing, the apparatus 1 comprises a carriage comprising an axially movable base plate 10 supporting cord-gripping members 11 and 12 on vertical supports 13 and 14 suitably fastened to base plate 10. The cords 15 and 16 are overlapped and their respective ends 17 and 18 held in taut parallel alignment in slots 19 by screws 20. The carriage base plate holding cords 15 and 16 is slidably mounted on a base 2 by means of bolts 23 extending through slots 25 into the base 2.

Axial reciprocating movement is imparted to the carriage by a driven cam 27 through idling circular cam follower 28 suitably mounted on support 30 which is suitably fastened to base plate 10, and by a coil spring 31 anchored at one end to the base plate 10 and at the other end to the base 2 by bolts 32.

The bobbin 5 comprises a circular annular fibre disc 3 slotted at 35 and having a center opening 36 sufficiently large to allow unobstructed passage of cord-gripping member 11. The outer circumferential edge 37 of the disc 3 is channeled as at 38 to accommodate three circular, idling guide wheels 39, which mount said disc peripherally; guide wheels 39 are suitably mounted on supports 41 and 42 which are suitably fastened to base 2.

The fibre disc 3 carries on one face a rotatably mounted let-off spool 48 carrying the splicing cord 49. Substantially diametrically opposite the left-off spool 48 is located an eyelet 54 suitably mounted on the fibre plate 3.

A motor 4 on base 2, acting through gear reducer 60, drives shaft 61 carrying a circular disc 62 whose outer circumferential edge 63 is grooved to carry resilient O-rings 65 contacting flanges 66 of fibre disc 3, whereby to rotate said fibre plate axially about the tautly held cords. Shaft 70 carrying the cam 27 is likewise driven by motor 4 through gear reducer 60, whose gear ratio is such that shaft 70 turns relatively slower than shaft 61. Operation of motor 4 thus causes rotation of the disc 3, and at the same time turns cam 76, moving base plate 10.

Figure 4:
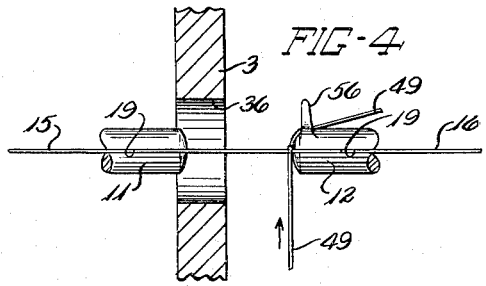

The wrapping operation as shown in Figures 4, 5 and 6 starts with the carriage base plate 10 at its extreme left, in which position it is held by the cam 27 as shown in Figures 1 and 4. The end of splicing cord 49 is pulled off let-off spool 48, placed across the two cords 15 and 16 to be spliced, through eyelet 54 and around finger 56. Upon starting the motor 4, the bobbin 5 will rotate about the overlapped cords 15 and 16, feeding the splicing cord 49 to the cords in timed relation to the speed of the disc 3, and laying about the cords a wind of splicing cord. Cooperation between cam 27 and coil spring 31 causes the carriage base plate 10 and clamping members 11 and 12 to move axially toward the right from the starting position, shown in Figure 5, thus laying a close helical wind 71 about cords 15 and 16. The limit of carriage base plate travel, and thus the length of the spliced area, preferably at least ½ inch, is determined by the rise A on the cam. Upon reaching the limit of right-hand travel, as shown in Figure 5, the further rotation of cam 27 will cause the carriage base plate to move axially toward its left limit as defined by the rise A of the cam, thus laying a second helical wind 72 covering the first. At the end of left-hand carriage base plate travel, as shown in Figure 6, the end 73 of carriage base plate 10 contacts switch 75, stopping the motor. The superfluous ends of cords 15, 16 and 49 may be trimmed in any suitable manner, resulting in a finished splice as shown in Figure 7, which may then be suitably sealed.

In the embodiment of the invention here shown, the shape of the cam edge 76 is such as to place more winds per inch in the center portion of the splice than at the ends, thus forming a tapered wind and distributing the stress in the cords 15 and 16 being spliced, and forming a high strength joint.

It will be understood, of course, that any number of convolutions and laps may be used, and that the configuration of the cam edge 76 may vary widely to produce different tapers of the wind. Likewise, it will be obvious that reciprocating and rotary motion may both be imparted to the splice winding bobbin without departing from the scope of the invention.

I claim:

1. A cord splicing machine, comprising spaced means for holding overlapping cords in axially fixed relation, means to move said spaced means reciprocably while retaining said cords in said fixed axial relation, and splicing means intermediate said holding means and rotating about said overlapping cords, whereby to lay a helical wrap of a splicing cord about said overlapping cords.

2. A cord splicing machine comprising a base plate, two supports mounted on said base plate, cord-gripping members on each of said supports adapted to hold two cords in taut parallel alignment, an annular plate peripherally mounted for axial rotation about said two cords, a let-off spool rotatably mounted on a face of said plate adapted to feed a splicing cord to said two cords in timed relation to the rotation of said plate, driving means mounted peripherally to said plate and adapted to drive said plate, driving means adapted to move said cord-gripping means reciprocably in a direction axially of said plate and in timed relation to the rotation thereof, whereby to lay close, tapered convolutions of said splicing cord about said two cords.

3. A cord splicing machine comprising a base plate, two supports mounted on said base-plate, cord-gripping members on each of said supports adapted to hold two cords in taut parallel alignment, an annular plate peripherally mounted for axial rotation about said two cords, a let-off spool rotatably mounted on a face of said plate adapted to feed a splicing cord to said two cords in timed relation to the rotation of said plate, driving means mounted peripherally to said plate and adapted to drive said plate, driving means to move said cord-gripping means and said plate reciprocably of one another in a direction axially of said plate and in timed relation to the rotation thereof, whereby to lay close helical convolutions of said splicing cord about said two cords.

References Cited in the file of this patent

UNITED STATES PATENTS

| 1,295,835 | Andren | Mar. 4, 1919 |
| 1,895,828 | Van Inwagen | Jan. 31, 1933 |
| 2,279,299 | Cavanagh | Apr. 14, 1942 |
| 2,514,184 | Lower | July 4, 1950 |
| 2,518,687 | Harvey | Aug. 15, 1950 |
| 2,765,003 | Willis et al. | Oct. 2, 1956 |

FOREIGN PATENTS

| 1,093,632 | France | Nov. 24, 1954 |